No. 877,685.

PATENTED JAN. 28, 1908.

D. W. WARNER.
DISK HARROW.
APPLICATION FILED APR. 18, 1907.

Witnesses:
M. M. Cameron
A. A. Adams

Inventor:
Daniel Webster Warner,
By Smith & Cameron attys

UNITED STATES PATENT OFFICE.

DANIEL W. WARNER, OF EDMONTON, ALBERTA, CANADA.

DISK HARROW.

No. 877,685.      Specification of Letters Patent.      Patented Jan. 28, 1908.

Application filed April 18, 1907. Serial No. 369,039.

*To all whom it may concern:*

Be it known that I, DANIEL WEBSTER WARNER, a subject of the Dominion of Canada, residing at Edmonton, in the Province of Alberta, Canada, have invented a new and useful Improvement in Disk Harrows, of which the following is a specification.

The object of the invention is to provide a detachable rim that may be fitted on the periphery of the disks of the ordinary disk harrows.

The rim is preferably V-shaped in cross section, but may be made in various shapes to provide for different purposes, the special purpose for which the rim is provided, is as a sub-surface packer for semi-arid surfaces.

The rim may be made in two semi-circular halves, provided at their adjoining ends with lugs, through which may pass the fastening means, or the rim may be made in one piece, formed with a break to adapt it being slipped over the edge of the disk.

Figures 1, 2:
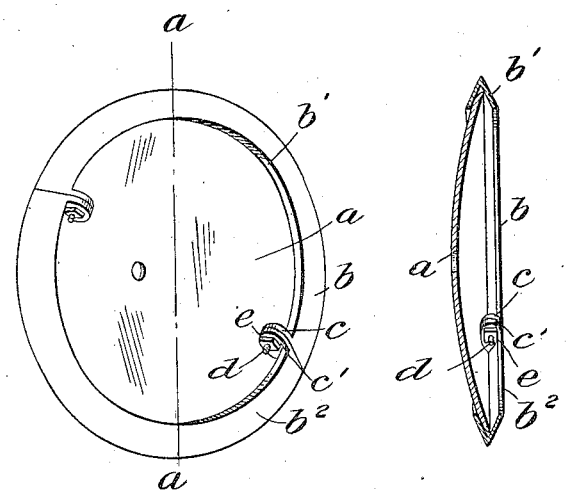
Figure 3:
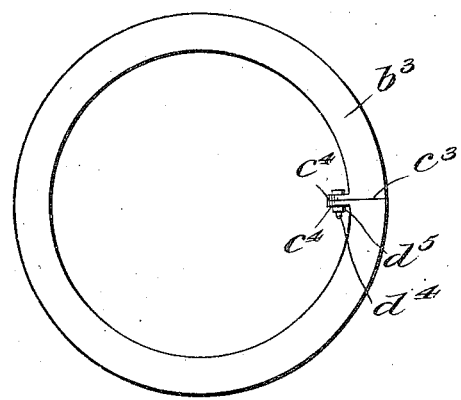

In the drawings; Figure 1 is a perspective view of a disk with a rim attached; Fig. 2 is a vertical sectional view on lines $a$—$a$ Fig. 1; and Fig. 3 is a side elevation of a modified form of the rim.

Like letters refer to like parts throughout the drawings and specification.

$a$ designates a disk of the ordinary harrow form, and $b$ a V-shaped rim, preferably formed in two-halves $b^1$ and $b^2$. Formed on each of the adjoining ends of each of the halves $b^1$ and $b^2$, are fastening lugs $c$ and $c^1$ respectively, and passing through the lugs are bolts $d$, provided with fastening nuts $e$.

As shown in the drawings bolts and nuts are employed in fastening the two halves together, but, rivets, split-rings or screws may be employed without deviating from the nature of the invention.

In Fig. 3 I have shown the rim formed in one piece $b^3$, and adapted to conform to the periphery of the disk. The rim $b^3$ is split at $c^3$ to facilitate the attaching and detaching on the disks. Each end of the rim is provided with a fastening lug $c^4$, through which passes a fastening bolt $d^4$, held in place by a fastening nut $d^5$.

What I claim as new and desire to secure by Letters Patent, is:—

1. In a disk harrow, the combination of a sectional rim adapted to be detachably fastened to the periphery of the disk said sections being V-shaped in cross section, substantially as and for the purpose specified.

2. The combination with a concavo-convex harrow disk, of a subsoil packing disk secured on the periphery of the harrow disk.

3. The combination with a concavo-convex harrow disk, of a concaved subsoil packing disk hooked upon the periphery of the harrow disk, and means for detachably securing the subsoil packing disk thereon.

4. In a disk harrow, the combination of a rim adapted to be detachably fastened to the periphery of the disk, said rim being V-shaped in cross section, substantially as and for the purpose specified.

5. In a disk harrow, the combination of a rim adapted to be detachably fastened to the periphery of the disk, said rim formed in two semi-circular sections, fastening lugs formed on the adjoining ends of each section, openings formed through said lugs, fastening bolts and nuts adapted to engage in said openings, said rim being V-shaped in cross section, substantially as and for the purpose specified.

Signed at Edmonton, this 29th day of August 1906.

D. W. WARNER.

Witnesses:
    ALICE A. BLAIN,
    WM. SHORT.